(12) United States Patent
Miyazaki et al.

(10) Patent No.: US 7,304,869 B2
(45) Date of Patent: Dec. 4, 2007

(54) INVERTER POWER SOURCE CONTROL FOR HIGH FREQUENCY HEATER

(75) Inventors: Shinobu Miyazaki, Osaka (JP); Masaki Nakaishi, Osaka (JP); Shinichi Masuda, Tondabayashi (JP)

(73) Assignees: Tabuchi Electric Co., Ltd., Osaka (JP); Sharp Kabushiki Kaisha, Osaka (JP)

( * ) Notice: Subject to any disclaimer, the term of this patent is extended or adjusted under 35 U.S.C. 154(b) by 95 days.

(21) Appl. No.: 10/558,424

(22) PCT Filed: May 25, 2004

(86) PCT No.: PCT/JP2004/007094

§ 371 (c)(1),
(2), (4) Date: Nov. 29, 2005

(87) PCT Pub. No.: WO2004/107552

PCT Pub. Date: Dec. 9, 2004

(65) Prior Publication Data

US 2006/0289511 A1    Dec. 28, 2006

(30) Foreign Application Priority Data

May 30, 2003    (JP) .............................. 2003-155353

(51) Int. Cl.
*H02M 7/122* (2006.01)
*H02M 1/36* (2006.01)

(52) U.S. Cl. ....................... 363/56.01; 219/718; 363/49

(58) Field of Classification Search ............. 363/21.04, 363/21.12, 55, 56.01, 56.09, 56.1, 56.11, 363/97, 131; 219/715, 716, 718, 721
See application file for complete search history.

(56) References Cited

U.S. PATENT DOCUMENTS 6,335,519 B1 * 1/2002 Cho et al. ................... 219/716
6,884,977 B2 * 4/2005 Han et al. ................... 219/715

FOREIGN PATENT DOCUMENTS

| JP | 51-20528 A | 2/1976 |
| JP | 3-53489 A | 3/1991 |
| JP | 2002-354659 A | 12/2002 |

* cited by examiner

*Primary Examiner*—Gary L Laxton
(74) *Attorney, Agent, or Firm*—Birch, Stewart, Kolasch & Birch, LLP

(57) ABSTRACT

At least one of a start abnormality detector (31), a temperature abnormality detector (32) and a voltage abnormality detector (33) has a latch inhibiting circuit for inhibiting retention of a detecting state when one of the abnormality detectors detects an abnormality, so that a current abnormality detector (34) can be inhibited from detecting an abnormal input current caused when the oscillation is halted by the abnormality detector. Accordingly, after the abnormality is removed, automatic resetting can be easily accomplished without causing the oscillation to halt as a result of the current abnormality detector detecting the presence of the abnormality. Also, since a power source abnormality detecting circuit (30) is designed in the form of an analog circuit, a low cost can be achieved and the monitoring level can be modified. In addition, the monitoring level associated only with the temperature abnormality occurring in an IGBT element (7) can be modified.

4 Claims, 6 Drawing Sheets

(Switching Element Drive Volt. Abnormal Detection)

INVERTER POWER SOURCE CONTROL FOR HIGH FREQUENCY HEATER

FIELD OF THE INVENTION

The present invention generally relates to an inverter power source that can be used as an electric power source in a high frequency heating apparatus such as, for example, a microwave oven having a magnetron and, more particularly to a control circuit employed therein for performing a protective operation.

BACKGROUND ART

In general, the inverter power source control circuit is so designed that an alternating current output from an alternating current power source is converted to a direct current output and, in order to convert this direct current output to a desired alternating current output that is to be supplied to a high frequency heating apparatus, a start signal such as, for example, a PWM control signal is applied to a gate of a switching element. A control circuit for controlling the entire inverter power source is so designed as to detect one or more abnormalities occurring in electric current, voltage and/or temperature in the high frequency heating apparatus to suppress the occurrence of such abnormalities and/or to halt oscillation of the inverter power source. In most cases, this control is performed with the use of a microcomputer. One conventional inverter power source control circuit is shown in FIG. 6.

Referring to FIG. 6, the microcomputer MC detects an abnormality occurring in an input current through a current transformer 6, an abnormal temperature in the high frequency heating apparatus through a temperature sensitive element 15, and an abnormality occurring in a drive voltage of a switching element 7.

Also, in the inverter power source used as an electric power source of a high frequency heating apparatus such as, for example, a microwave oven, the switching element referred to above is generally employed in the form of an insulated gate bipolar transistor (IGBT) element. This IGBT element is a one-chip element, in which a MOS-FET (metal-oxide semiconductor field-effect transistor) and a bipolar transistor are combined together and therefore has combined features of a low electric drive power and a high speed switching characteristic, both exhibited by the MOS-FET and a low resistance exhibited by the bipolar transistor.

On the one hand, the control circuit is known, which is in the form of an analog circuit, not a digital circuit utilizing a microcomputer, for detecting an abnormal electric current, an abnormal electric voltage and an abnormal temperature individually and for subsequently halting the oscillation of the inverter power source. See, for example, the Japanese Laid-open Patent Publication No. 2002-354659.

Detection of the abnormal electric current is generally intended to detect an abnormality occurring in the input electric current when the input electric current lowers as a result of the power failure such as brought about by breakage of the magnetron, and unless a trouble shooting is successfully performed, the detection is sustained. However, with the conventional analog circuit, since an abnormality occurring in the input electric current is detected even when the oscillation is halted because of the abnormal voltage and/or the abnormal temperature, the abnormal current detection is required to be reset when operation is to be restarted upon removal of the abnormal voltage and/or the abnormal temperature, making it difficult to accomplish an automatic resetting.

On the other hand, in the inverter power source for a microwave oven, which utilizes an IGBT element, although the IGBT element has such an excellent characteristic as hereinbefore described, it has a drawback due to its structure, in that it may function erroneously when applied with an excessive electric current and is possibly apt to breakdown as the IGBT element is more sensitive to influences brought about by overheating than any other elements. In view of this characteristic, such abnormalities must be monitored for safety purpose, i.e., to protect from the excessive current and, even with other component parts such as, for example, a magnetron and PWM, the occurrence of an abnormality must also be monitored for safety purpose. Accordingly, the need is widely recognized that the abnormal temperature, voltage and current must be comprehensively monitored to accomplish the protection. In such case, it may occur that the abnormality monitoring level is required to modify during the maintenance and/or revision of the safety standards. Also, even at the time of shipment, the monitoring level would be required to modify depending on requirements in a country in which the inverter power source is used.

However, considering that a microcomputer is used for controlling a protection device for the conventional inverter power source and the monitoring level is programmed in the computer, modification of the monitoring level is generally difficult to accomplish. Also, where the microcomputer is used, there is a problem in that the cost of manufacture of devices does not decrease.

DISCLOSURE OF THE INVENTION

In view of the foregoing, the present invention has been devised to substantially eliminate the foregoing problems and inconveniences and is intended to provide an inverter power source control circuit for a high frequency heating apparatus, which can be easily automatically reset after removal of an abnormality and in which in consideration of the characteristic of the switching element such as, for example, the IGBT element, the monitoring level can easily be modified at a low cost.

In order to accomplish the foregoing object, the present invention provides an inverter power source control circuit for a high frequency heating apparatus, which an inverter power source circuit for supplying an electric power to the high frequency heating apparatus by rectifying an alternating current output from an alternating current source to a direct current output and rectifying the direct current output to a desired alternating current output by applying a drive signal, based on a start signal, to a switching element. This inverter power source control circuit includes an electric power source abnormality detecting circuit including a start abnormality detector for detecting an abnormal start signal, a temperature abnormality detector for detecting an abnormal temperature, a voltage abnormality detector for detecting an abnormal voltage present in the drive signal to be applied to the switching element, and a current abnormality detector for detecting an abnormal input current while retaining a detecting state; an inverter oscillation control circuit operable in response to a abnormality detection signal fed from at least one of those abnormality detectors to output an abnormality control signal to the switching element to halt oscillation of the inverter power source, thereby protecting from an abnormality occurring in the power source;

and a latch inhibiting circuit provided in at least one of the start abnormality detector, the temperature abnormality detector and the voltage abnormality detector for inhibiting retention of the detecting state of the abnormality detector whereby the current abnormality detector is inhibited from detecting the abnormal input current based on a halt of the oscillation brought about by the detection of the abnormality, thereby allowing an automatic resetting to be accomplished upon removal of the abnormality without causing the oscillation to halt as a result of the current abnormality detector detecting the presence of the abnormality.

According to the present invention, since at least one of the start abnormality detector, the temperature abnormality detector and the voltage abnormality detector is provided with the latch inhibiting circuit for inhibiting retention of the detecting state of the abnormality detector so that the current abnormality detector can be inhibited from detecting the abnormal input current based on a halt of the oscillation brought about by the detection of the abnormality, the automatic resetting can be accomplished upon removal of the abnormality without causing the oscillation to halt as a result of the current abnormality detector detecting the presence of the abnormality.

Preferably, the inverter power source control circuit for the high frequency heating apparatus may also include a reference voltage setting circuit for setting a reference voltage for detection of an abnormality. In this case, the start abnormality detector detects the abnormal start signal by comparing, with a first voltage comparator, an output voltage of an PWM control signal, which is the start signal, with a first reference voltage set by the reference voltage setting circuit; the temperature abnormality detector includes a heat sensitive element disposed in a vicinity of an insulated gate bipolar transistor element, which is the switching element, and operable to detect the abnormal temperature by comparing, with a second voltage comparator, a voltage generated in correspondence with the detected temperature, with a second reference voltage set by the reference voltage setting circuit; the voltage abnormality detector detects the abnormal voltage by detecting the drive signal to be fed to a gate of the IGBT element corresponding to an input voltage from the alternating current power source and the comparing, with a third voltage comparator, the voltage of the detected drive signal with a third reference voltage set by the reference voltage setting circuit; and the current abnormality detector includes a current transformer for detecting an input current fed from the alternating current power source and detects the abnormal current by retaining a detected voltage generated in correspondence with the detected input current and by comparing, with a fourth voltage comparator, the detected voltage, so retained, with a fourth reference voltage set by the reference voltage setting circuit.

Accordingly, since in consideration of the characteristic of the IGBT element, the power source abnormality detecting circuit including the detection of an abnormality occurring in the temperature of the IGBT element and the gate voltage is designed in the form of an analog circuit, the cost of manufacture of the device can be reduced and, also, since the reference voltage for the detection of each of the abnormalities can easily be set by the reference voltage setting circuit, the monitoring level can easily be modified. In addition, modification of the monitoring level can be carried out for each of the abnormality detectors and, particularly in consideration of the characteristic of the IGBT element, only the monitoring level associated with the detection of the presence or absence of the abnormal temperature can be modified.

Again preferably, the first to fourth voltage comparators referred to above may be provided in the form of a single voltage comparator capable of performing a corresponding number of comparing functions. Accordingly, the device can be compactized and can further be reduced in cost.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Hereinafter, a preferred embodiment of the present invention will be described in detail with reference to the accompanying drawings.

Figure 1:
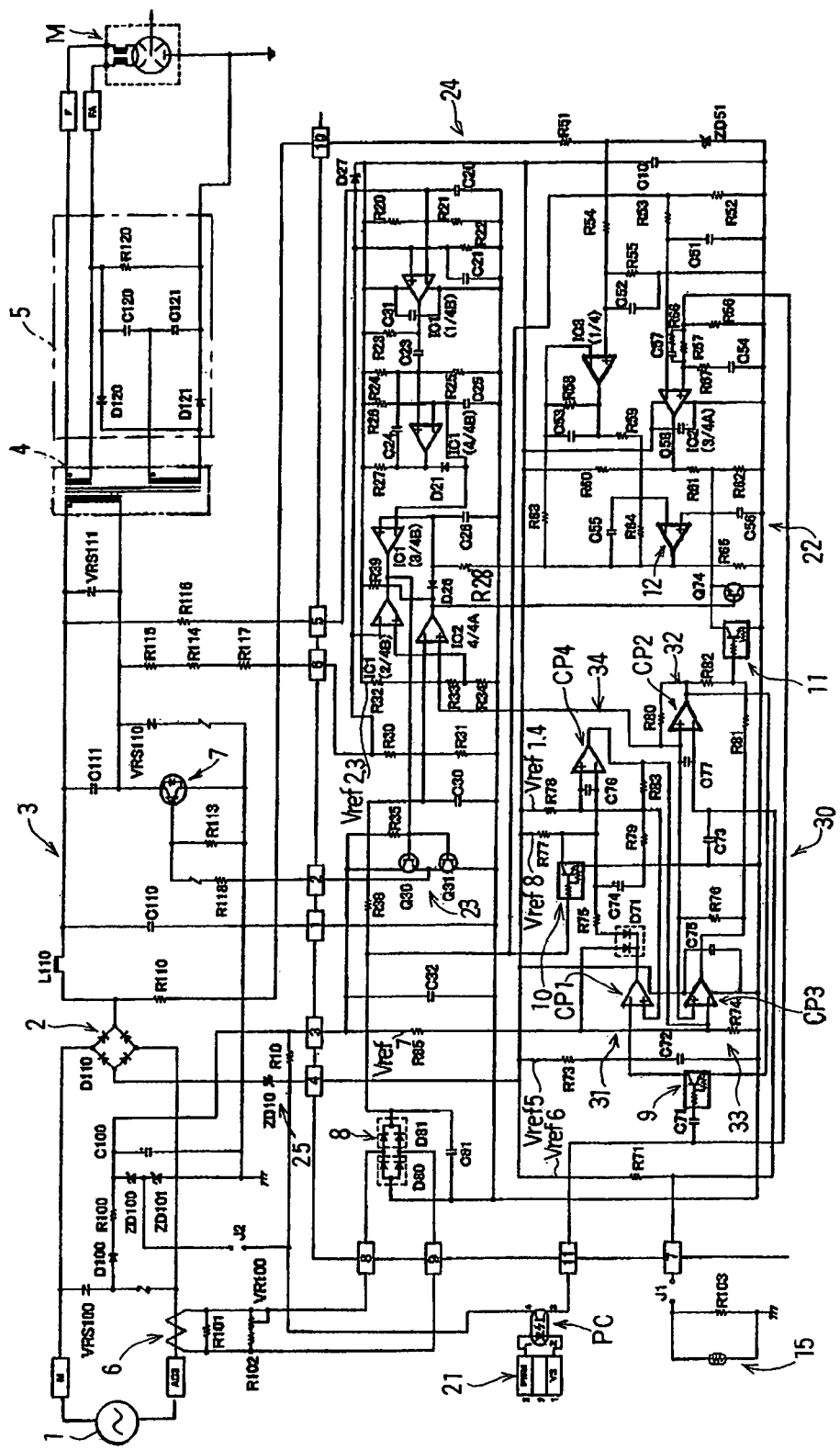
FIG. 1 is a circuit block diagram showing an inverter power source control circuit for a high frequency heating apparatus according to a preferred embodiment of the present invention.

FIG. 1 illustrates a circuit block diagram of an inverter power source control circuit for a high frequency heating apparatus according to the embodiment of the present invention. This inverter power source is used as an electric power source for a high frequency heating apparatus such as, for example, a microwave oven having a magnetron, and a control circuit 24 built in the inverter power source for controlling the entirety also performs a control to protect the inverter power source and the microwave oven from power source abnormalities including an abnormal start, an abnormal temperature, an abnormal voltage and an abnormal current.

The inverter power source includes an alternating current (AC) power source 1, a converter 2, an inverter 3, a high frequency transformer 4 and a magnetron drive circuit 5. The inverter 3 is operable through the AC power source 1 and then through the converter 2 to cause a high frequency electric current to generate from a primary winding coil of the high frequency transformer 4, so that the magnetron drive circuit 5 electrically connected with a secondary winding of the high frequency transformer 4 can generate a rectified electric power of a doubled voltage necessary to drive a magnetron M. A current transformer (CT) 6 for detecting an electric input current fed from the AC power source 1 is interposed between the AC power source 1 and the converter 2.

The inverter 3 includes a start signal generating circuit 21 for generating a start signal such as, for example, a PWM control signal, an inverter oscillation control circuit 22 for controlling the oscillation of the inverter power source based on the output from the start signal generating circuit 21, an IGBT (insulated gate bipolar transistor) drive circuit 23 operable in response to the control of the inverter oscillation control circuit 22 to feed a predetermined ON/OFF control signal (a drive signal) to a gate of a switching element such as, for example, an IGBT element 7 to thereby drive the latter, and the IGBT element 7 that is driven in response to the predetermined ON/OFF control signal, applied to the gate thereof from the inverter oscillation control circuit 22, to generate a high frequency current. The inverter oscillation control circuit 22 is operable to output an abnormality control signal to the gate of the IGBT element 7 to halt the oscillation of the inverter power source in the event that at lest one of the abnormal start, abnormal temperature, abnormal voltage and abnormal current is detected.

The control circuit 24 built in the inverter power source as hereinabove described includes a power source abnormality detecting circuit 30 including a start abnormality detector 31 for detecting an abnormal start signal, a temperature abnormality detector 32 for detecting an abnormal temperature, a voltage abnormality detector 33 for detecting an abnormal voltage of the drive signal to be applied to the IGBT element 7 and a current abnormality detector 34 for detecting an abnormal input current while a detected condition thereof is held. This control circuit 24 also includes a reference voltage setting circuit 25 for setting a reference voltage that is used for the abnormality detection.

The reference voltage setting circuit 25 has a capability of setting first to fourth reference voltages Vref1, Vref2, Vref3 and Vref4 to a desired value for the detection of the abnormal start, the detection of the abnormal temperature, the detection of the abnormal voltage and the detection of the abnormal current, respectively, when a predetermined resistance, for example, is connected with a reference voltage source. It is, however, to be noted that a variable resistor may be connected with the reference voltage source so that the desired voltage can be set by varying the resistance of the variable resistor. In the illustrated embodiment, the reference voltages Vref1 and Vref4 and the reference voltages Vref2 and Vref3 are common to each other. Also, to provide a voltage source for the generation of a detecting voltage with respect to the abnormality detection signal, a fifth reference voltage Vref5 is provided for the first reference voltage Vref1 for the detection of the abnormal start; a sixth reference voltage Vref6 is provided for the second reference voltage Vref2 for the detection of the abnormal temperature; a seventh reference voltage Vref7 is provided for the third reference voltage Vref3 for the detection of the abnormal voltage; and an eighth reference voltage Vref8 is provided for the fourth reference voltage Vref4 for the detection of the abnormal current. It is, however, to be noted that where some of those reference voltages are made common to each other, the voltage setting therefor can be facilitated.

While the various abnormality detectors 31 to 34 are specifically shown in FIGS. 2 to 5, respectively, it is to be noted that the circuit shown in each of FIGS. 2 to 5 is a detailed version of the relevant portion of the circuit of FIG. 1 and that the circuit arrangement is reordered partly for the sake of brevity for each of the abnormality detector 31 to 34.

Figure 2:
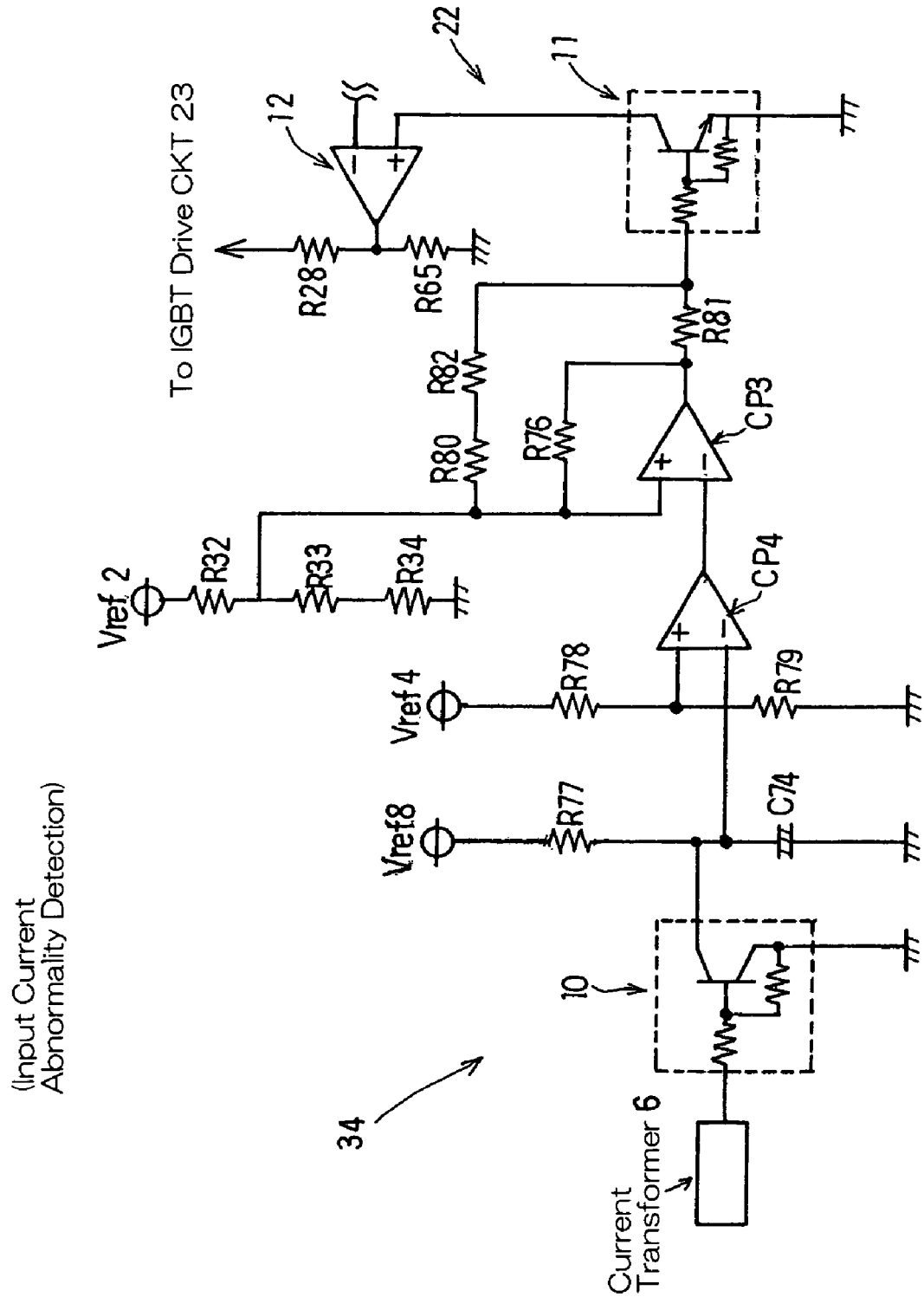
FIG. 2 is an electric circuit diagram showing an current abnormality detecting circuit.

Monitoring of Current (Voltage) in Current Transformer 6:

The details of the current abnormality detector 34 are shown in FIG. 2. This current abnormality detector 34 monitors a voltage of an input current to the current transformer 6 for the purpose of detecting the abnormal input current in the event of a failure of the input current that may occur as a result of a breakdown of the magnetron M or a similar reason.

The current abnormality detector 34 referred to above is operable to monitor the voltage of the current transformer 6. In this current abnormality detector 34, the fourth reference voltage Vref4 set by the reference voltage setting circuit 25 and subsequently divided by resistors R78 and R79 is fed to a positive (+) terminal of a fourth voltage comparator CP4; a rectifier 8 shown in FIG. 1 is electrically connected with an output terminal of the current transformer 6 for conversion to a direct current; this output from the current transformer 6 is fed to the base of a transistor 10; a series connected circuit including a resistor R77 and a capacitor C74 is connected between the eighth reference voltage Vref8 and the ground; and a junction between the resistor R77 and the capacitor C74 is connected with the collector of the transistor 10 and also with a negative (−) terminal of the fourth voltage comparator CP4; and the transistor 10 has an emitter connected with the ground.

When the input current of the current transformer 6 lowers, the transistor 10 is switched off to allow an electric current to flow from the resistor R77 to the capacitor C47 with the voltage in the capacitor C74 increased consequently. The speed at which the voltage in the capacitor C74 increases depends on the time constant determined by the series connected circuit of the resistor R77 and the capacitor C74, which time constant is set to, for example, 10 to 20 seconds only as a guide in consideration of a time lag of the magnetron output, which may occur at the time of start, and/or prevention of an occurrence of damages to component parts, which may be brought about by an abrupt halt in the event of an abnormality. The voltage charged on the capacitor C74 and the fourth reference voltage Vref4 are compared by the fourth voltage comparator CP4 with each other to determine the presence of an abnormal current. An output from the fourth voltage comparator CP4 is fed to the inverter oscillation control circuit 22 and a transistor 11 is subsequently switched on to lower the voltage appearing at a positive (+) terminal of a voltage comparator 12. When the absolute voltage at the positive terminal of the voltage comparator 12 attains a value lower than that appearing at a negative (−) terminal of the voltage comparator 12, the voltage comparator 12 output a low level signal that is an indication of an abnormality control signal. This abnormality control signal is fed to the gate of the IGBT element 7 through the IGBT drive circuit 23, shown in FIG. 1, to thereby switch the IGBT element 7 off to halt the oscillation of the inverter power source.

The current abnormality detector 34 is operable to detect the presence of the abnormal input current caused by, for example, breakdown of the magnetron M and will, therefore, retain a detecting state unless subsequent to the successful trouble shooting, the voltage on the capacitor C74 is discharged, followed by resetting of the current abnormality detector 34. In other words, the current abnormality detector 34 has a latch function to retain the detecting state and, during a period in which the capacitor C74 is charged, oscillation of the inverter power source is kept halted.

Figure 3:
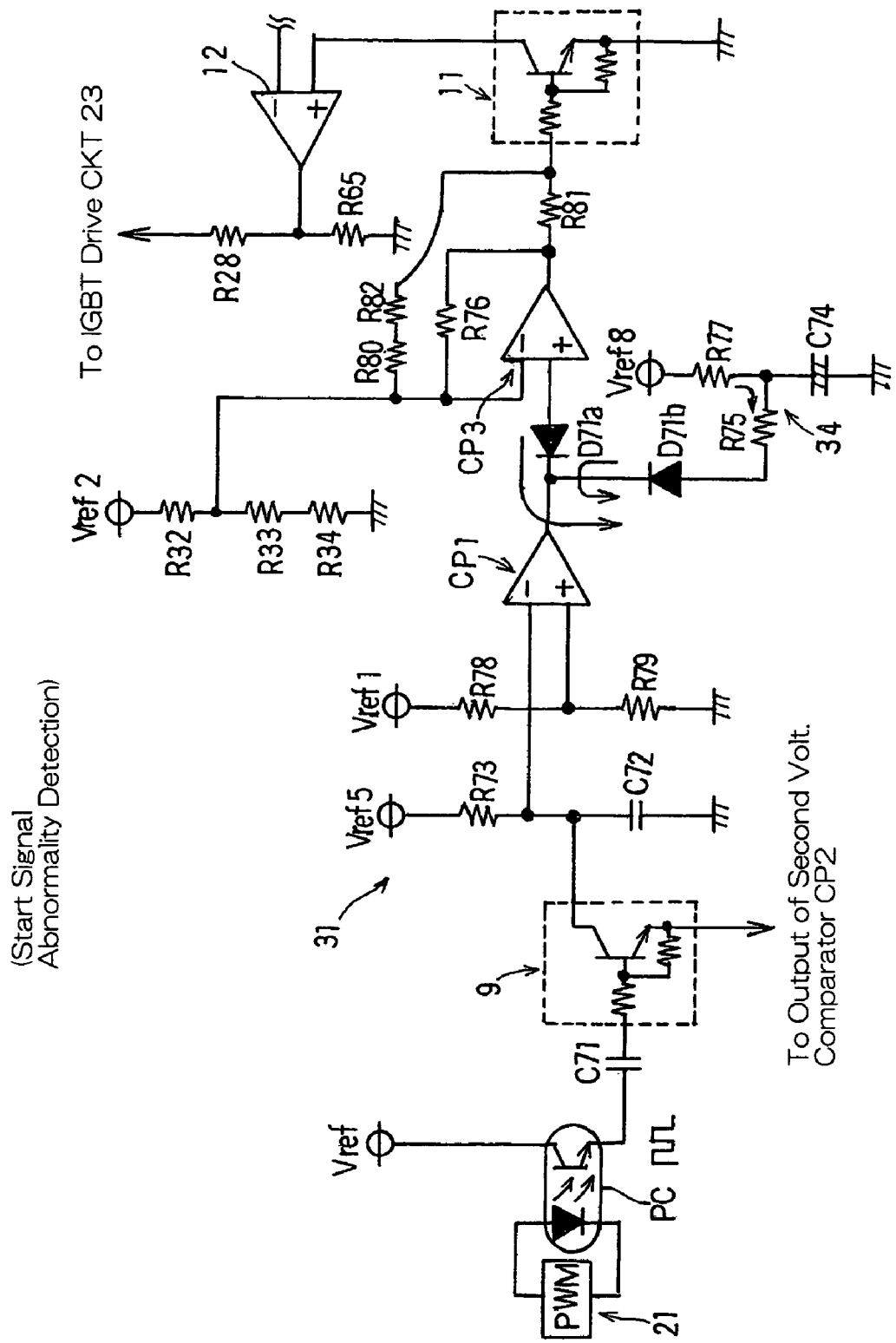
FIG. 3 is an electric circuit diagram showing a start abnormality detecting circuit.

Monitoring of PWM Control Signal (Drive Signal):

The details of start abnormality detector 31 are shown in FIG. 3. In the inverter power source, the microcomputer may function erroneously under the influence of noises when, for example, the PWM control signal is not inputted to the control circuit 24 as a result of, for example, a breakdown of a photocoupler PC used to transmit the PWM control signal in the form of a light signal. For this reason, for the purpose of the detection of the presence or absence of the abnormal start signal that is inputted to the control circuit 24, this start abnormality detector 31 monitors an output voltage of the PWM control signal.

The start abnormality detector 31 referred to above is operable to monitor the output voltage of the PWM control signal fed from the start signal generating circuit 21. In this start abnormality detector 31, the first reference voltage Vref1 set by the reference voltage setting circuit 25 and subsequently divided by resistors R78 and R79 is fed to a positive (+) terminal of a first voltage comparator CP1; the PWM control signal is transmitted by the photocoupler PC in the form of a light signal and an output from the photocoupler PC is in turn fed to the base of a transistor 9 through a capacitor C71; a series connected circuit including a resistor R73 and a capacitor C72 is connected between the fifth reference voltage Vref5 and the ground; and a junction between the resistor R73 and the capacitor C72 is connected with the collector of the transistor 9 and also with a negative (−) terminal of the first voltage comparator CP1; and the transistor 9 has an emitter connected with an output terminal of a second voltage comparator CP2.

Also, the start abnormality detector 31 is electrically connected with the current abnormality detector 34 and, for this purpose, a resistor R75 is connected with a junction between the resistor 77 and the capacitor 74 and also with a junction between the first voltage comparator CP1 and a diode D71a through a diode D71b. This circuit forms a latch inhibiting circuit in the start abnormality detector 31 for inhibiting the current abnormality detector 34 from retention of the detecting state of the abnormal input current based on the halt of oscillation resulting from the detection of the presence of the abnormal start.

In the event that the signal from the photocoupler PC is not a PWM control signal, the transistor 9 maintains a switched-off state, allowing the voltage on the capacitor C72 to increase. When the voltage at a negative terminal of the first voltage comparator CP1 attains a value higher than that appearing at a positive (+) terminal of the first voltage comparator CP1 in terms of the absolute voltage, the first voltage comparator CP1 outputs a low level signal. This leads to lowering of the voltage at a negative terminal of the third voltage comparator CP3 through the diode D71a and when the voltage at the negative terminal of the third voltage comparator CP3 attains a value lower than that at the positive terminal thereof in terms of the absolute value, the third voltage comparator CP3 outputs a high level signal.

When the output from the third voltage comparator CP3 becomes high in level, a transistor 11 in the inverter oscillation control circuit 22 is switched on, accompanied by lowering of the voltage appearing at the positive terminal of the voltage comparator 12. When the voltage at the positive terminal of the voltage comparator 12 becomes lower than that at the negative terminal thereof, the voltage comparator 12 outputs a low level signal that is an indication of the abnormality control signal. This abnormality control signal is similarly applied to the gate of the IGBT element 7 through the IGBT drive circuit 23 shown in FIG. 1 to switch the IGBT element 7 off, with the oscillation of the inverter power source halted consequently.

On the other hand, in the event of the abnormal start being detected, the abnormal current is detected in the current abnormality detector 34 based on the halt of the oscillation brought about by the start abnormality, but since the output from the first voltage comparator CP1 is held in a low level state, the latch inhibiting circuit causes the charging current fed to the capacitor C74 of the current abnormality detector 34 flows through the diode D71b to thereby inhibit the capacitor C74 from being charged. Accordingly, after the successful trouble shooting to remove the start abnormality, an automatic resetting can be facilitated without the oscillation being halted, which would otherwise occur upon detection of the start abnormality by the current abnormality detector 34.

Figure 4:
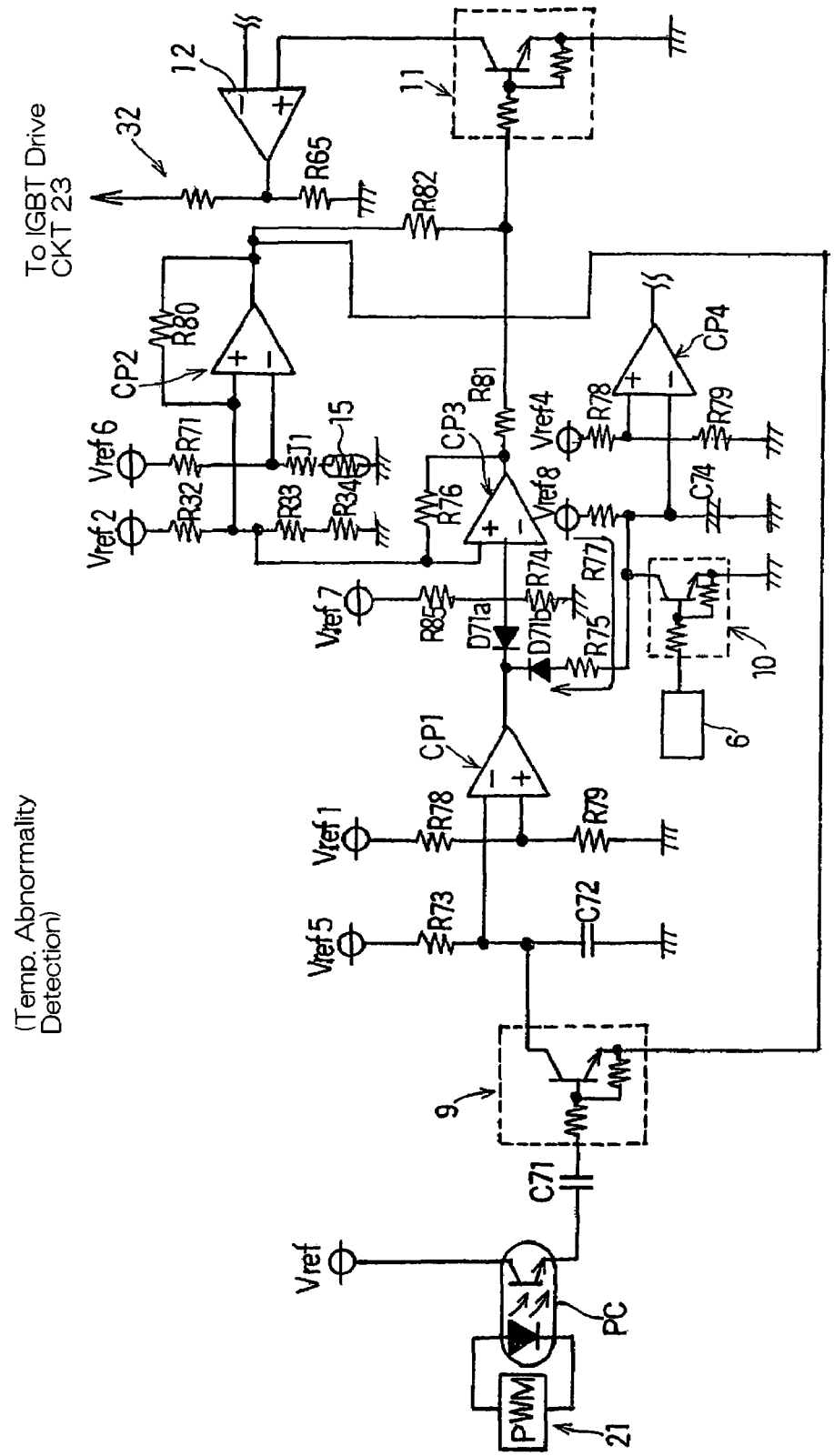
FIG. 4 is an electric circuit diagram showing a temperature abnormality detecting circuit.

Monitoring of Temperature of IGBT Element 7:

The details of the temperature abnormality detector 32 are shown in FIG. 4. When the temperature inside a heating chamber of a microwave oven increases abnormally as a result of, for example, the magnetron M being over-loaded, a cooling fan of the microwave oven being halted, and/or deposition of food lees and refuses inside the heating chamber, the temperature of the IGBT element 7 mounted on an power source substrate increases correspondingly. The IGBT element 7 is more sensitive to the abnormal temperature than any other circuit component parts and will be apt to breakdown when overheated, possibly accompanied by excursion of the inverter power source. Accordingly, for the detection of the presence or absence of the abnormal temperature as discussed above, this temperature abnormality detector 32 is most effectively used to monitor the temperature of the IGBT element 7.

The temperature abnormality detector 32 referred to above is operable to monitor the temperature of the IGBT element 7 and includes a heat sensitive element 15 such as, for example, a thermister mounted on, for example, a power source substrate in the vicinity of the IGBT element 7. In this temperature abnormality detector 32, the second reference voltage Vref2 set by the reference voltage setting circuit 25 and subsequently divided by resistors R32, R33 and R34 is fed to a positive (+) terminal of the second voltage comparator CP2; a resistor R71 and a thermister 15 are electrically connected between the six reference voltage Vref6 and the ground; and a junction between the resistor R71 and the thermister 15 is electrically connected with a negative (−) terminal of the second voltage comparator CP2. The second voltage comparator CP2 compares a voltage, generated as an indication of the temperature detected by the thermister 15, with the second reference voltage Vref2 for the purpose of detecting the presence or absence of the abnormal temperature.

Also, the emitter of the transistor 9 of the start abnormality detector 31 is connected with an output terminal of the second voltage comparator CP2. This circuit forms a latch inhibiting circuit in the temperature abnormality detector 32 for inhibiting the current abnormality detector 34 from retention of the detecting state of the abnormal temperature based on the halt of oscillation resulting from the detection of the presence of the abnormal temperature.

When the temperature of the thermister 15 increases, the resistance of the thermister 15 itself decreases, accompanied by lowering of the voltage at the negative terminal of the second voltage comparator CP2. When the voltage at the negative terminal of the second voltage comparator CP2 lowers to a value lower than that at the positive terminal of the same second voltage comparator CP2 in terms of the absolute value, the second voltage comparator CP2 outputs a high level signal. When the high level signal is so outputted from the second voltage comparator CP2, the transistor 11 of the inverter oscillation control circuit 22 is switched on, accompanied by lowering of the voltage at the positive terminal of the voltage comparator 12. When this voltage at the positive terminal of the voltage comparator 12 decreases to a value lower than that at the negative terminal thereof in terms of the absolute value, the voltage comparator 12 outputs a low level signal representative of the abnormality control signal. This abnormality control signal is then supplied to the gate of the IGBT element 7 through the IGBT drive circuit 23, shown in FIG. 1, to switch the IGBT element 7 off, with the oscillation of the inverter power source halted consequently.

On the other hand, in the event of the abnormal temperature detected, the abnormal current is detected in the current abnormality detector 34 based on the halt of the oscillation brought about by increase of the temperature, but a latch inhibiting circuit works in this case. Specifically, since the PWM control signal is kept inputting from the start signal generating circuit 21 even when the oscillation is halted as a result of the detection of the abnormal temperature, and since the emitter of the transistor 9 is electrically connected with the output terminal of the second voltage comparator CP2, the output from the second voltage comparator CP2 is held in a high level state. Under these circumstances, the transistor 9 is unable to cause a capacitor Q72 to discharge the voltage charged thereon and, therefore, the voltage at the negative terminal of the first voltage comparator CP1 increases, with a low level signal consequently outputted from the first voltage comparator CP1. When the first voltage comparator CP1 outputs the low level signal in this way, the charging current fed to the capacitor C74 of the current abnormality detector 34 is discharged through the diode D71b and the capacitor C74 is no longer charged. Therefore, no function of detecting the abnormal current works in such case. Accordingly, after the successful trouble shooting to remove the temperature abnormality, an automatic resetting can be facilitated without the oscillation being halted, which would otherwise occur upon detection of the start abnormality by the current abnormality detector 34.

Figure 5:
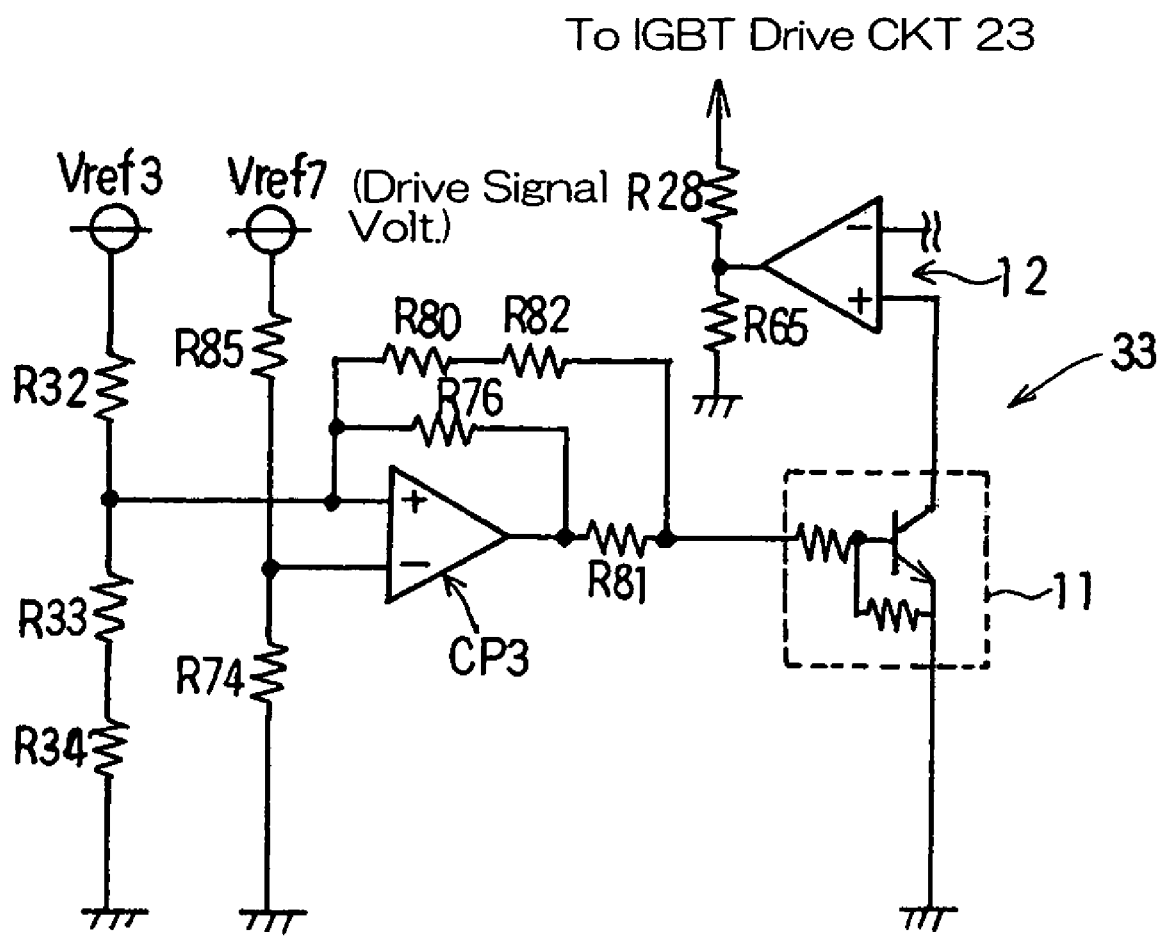
FIG. 5 is an electric circuit diagram showing a voltage abnormality detecting circuit.
Figure 6:
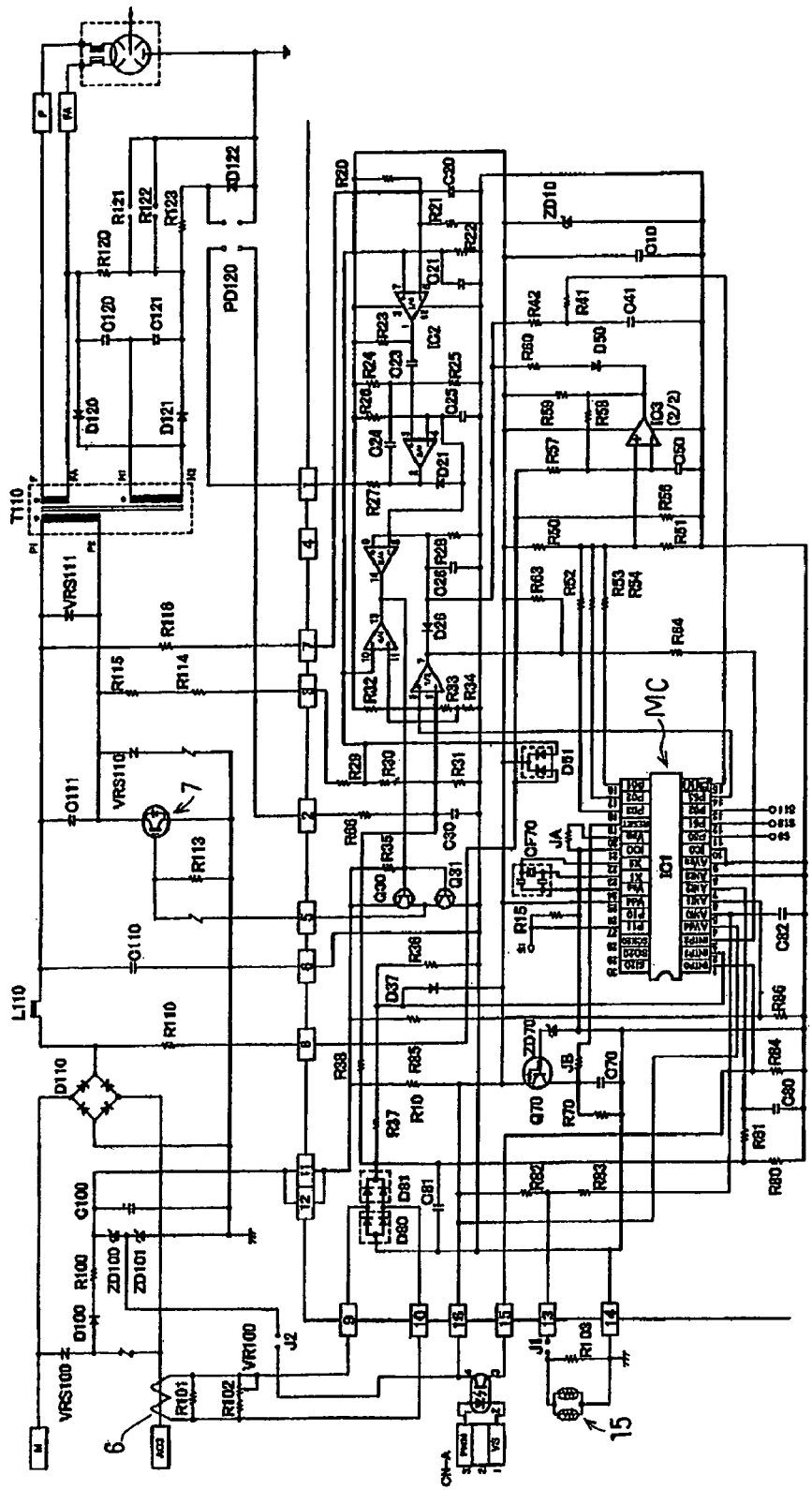
FIG. 6 is an electric circuit diagram showing the conventional inverter power source control circuit for a high frequency heating apparatus.

Monitoring of Drive Signal Voltage of IGBT Element 7:

The details of the voltage abnormality detector 33 is shown in FIG. 5. This voltage abnormality detector 33 is operable to monitor the voltage of the drive signal to be applied to the gate of the IGBT element 7 in correspondence with the AC power source 1. This voltage abnormality detector 33 is provided for the purpose of detection of the presence or absence of an abnormal voltage with the aim of minimizing or substantially eliminating damages to various electric component parts of the inverter power source including the IGBT element 7, which would otherwise occur in the event that the input voltage from the AC power source 1 is extremely lowered as a result of, for example, an abnormality occurring in an electric power line and/or lightning strike.

The voltage abnormality detector 33 is operable to monitor the voltage of the drive signal to be supplied to the IGBT element 7. In this voltage abnormality detector 33, the third reference voltage Vref3 set by the reference voltage setting circuit 25 and subsequently divided by the resistors R32, R33 and R34 is fed to a positive (+) terminal of the third voltage comparator CP3; resistors R85 and R74 are electrically connected between the seventh reference voltage (the voltage of the drive signal to be applied to the IGBT element 7) and the ground; and a junction between the voltage dividing resistors R85 and R74 is electrically connected with a negative (−) terminal of the third voltage comparator CP3. The drive signal voltage to be applied to the gate of the IGBT element 7 and the third reference voltage Vref3 are compared with each other by the third voltage comparator CP3 to detect the presence or absence of the abnormal voltage. When the output from the third voltage comparator CP3 is supplied to the inverter oscillation control circuit 22 and, similarly, the abnormality control signal is supplied to the gate of the IGBT element 7 through the IGBT drive circuit 23, the IGBT element 7 is switched off to halt the oscillation of the inverter power source. It is to be noted that although in this instance no latch inhibiting circuit such as employed in any one of the start abnormality detector 31 and the temperature abnormality detector 32 is employed in the voltage abnormality detector 33, it may be equally employed if so desired.

As hereinbefore fully described, according to the present invention, at least one of the start abnormality detector 31, the temperature abnormality detector 32 and the voltage abnormality detector 33 is provided with the latch inhibiting circuit for habiting retention of the detecting state of the abnormality detector so that the current abnormality detector 34 can be inhibited from retention of the detecting state of the abnormal input current based on the halt of the oscillation brought about by the detection of the abnormality, the automatic resetting can easily be accomplished upon removal of the abnormality without causing the oscillation to halt that is brought about when the current abnormality detector 34 detects the presence of the abnormality.

Also, since the power source abnormality detecting circuit 30 for detecting the temperature of the IGBT element 7 and an abnormality present in the voltage to be applied to the gate of the IGBT element 7 in consideration of the characteristic of the IGBT element 7 and for detecting the abnormal current present in the current transformer 6 is designed in the form of an analog circuit, the cost of manufacture of the device can be reduced as compared with the conventional digital circuit utilizing the microcomputer, and the freedom of design in arranging the various abnormality detectors on the power source substrate can be increased. Also, since the reference voltage for the detection of each of the abnormalities can easily be set by the reference voltage setting circuit 25, the monitoring level can easily be modified. In addition, modification of the monitoring level can be carried out for each of the abnormality detectors and, particularly in consideration of the characteristic of the IGBT element 7, only the monitoring level associated with the detection of the presence or absence of the abnormal temperature can be modified.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in describing the foregoing embodiment of the present invention, reference has been made to the use of four separate voltage comparators CP1 to CP4. However, they may be replaced with a single voltage comparator, provided that it can perform a plurality of comparing functions that are, in the illustrated embodiment, accomplished by the separate voltage comparators. In such case, the device can further be reduced in weight and in manufacturing cost.

Accordingly, such changes and modifications are, unless they depart from the scope of the present invention as delivered from the claims annexed hereto, to be construed as included therein.

What is claimed is:

1. An inverter power source control circuit for a high frequency heating apparatus, which is an inverter power source circuit for supplying an electric power to the high frequency heating apparatus by rectifying an alternating current output from an alternating current source to a direct current output and rectifying the direct current output to a desired alternating current output by applying a drive signal, based on a start signal, to a switching element, which circuit comprises:

an electric power source abnormality detecting circuit including a start abnormality detector for detecting an abnormal start signal, a temperature abnormality detector for detecting an abnormal temperature, a voltage abnormality detector for detecting an abnormal voltage present in the drive signal to be applied to the switching element, and a current abnormality detector for detecting an abnormal input current while retaining a detecting state;

an inverter oscillation control circuit operable in response to a abnormality detection signal fed from at least one of those abnormality detectors to output an abnormality control signal to the switching element to halt oscillation of the inverter power source, thereby protecting from an abnormality occurring in the power source; and a latch inhibiting circuit provided in at least one of the start abnormality detector, the temperature abnormality detector and the voltage abnormality detector for inhibiting retention of the detecting state of the abnormality detector whereby the current abnormality detector is inhibited from detecting the abnormal input current based on a halt of the oscillation brought about by the detection of the abnormality, thereby allowing an automatic resetting to be accomplished upon removal of the abnormality without causing the oscillation to halt as a result of the current abnormality detector detecting the presence of the abnormality.

2. The inverter power source control circuit for the high frequency heating apparatus as claimed in claim 1, further comprising:

a reference voltage setting circuit for setting a reference voltage for detection of an abnormality;

wherein the start abnormality detector detects the abnormal start signal by comparing, with a first voltage comparator, an output voltage of an PWM control signal, which is the start signal, with a first reference voltage set by the reference voltage setting circuit;

wherein the temperature abnormality detector includes a heat sensitive element disposed in a vicinity of an insulated gate bipolar transistor element, which is the switching element, and operable to detect the abnormal temperature by comparing, with a second voltage comparator, a voltage generated in correspondence with the detected temperature, with a second reference voltage set by the reference voltage setting circuit;

wherein the voltage abnormality detector detects the abnormal voltage by detecting the drive signal to be fed to a gate of the IGBT element corresponding to an input voltage from the alternating current power source and the comparing, with a third voltage comparator, the voltage of the detected drive signal with a third reference voltage set by the reference voltage setting circuit; and wherein the current abnormality detector includes a current transformer for detecting an input current fed from the alternating current power source and detects the abnormal current by retaining a detected voltage generated in correspondence with the detected input current and by comparing, with a fourth voltage comparator, the detected voltage, so retained, with a fourth reference voltage set by the reference voltage setting circuit.

3. The inverter power source control circuit for the high frequency heating apparatus as claimed in claim 2, wherein the first to fourth voltage comparators are provided in the form of a single voltage comparator capable of performing a corresponding number of comparing functions.

4. The inverter power source control circuit for the high frequency heating apparatus as claimed in claim 1, wherein the high frequency heating apparatus is a microwave oven.

* * * * *